United States Patent [19]
Brown

[11] Patent Number: 5,836,184
[45] Date of Patent: Nov. 17, 1998

[54] SAFETY GUARD FOR AEROSOLS

[76] Inventor: Paul E. Brown, 135 Bantam Lake Rd., Bantam, Conn. 06750

[21] Appl. No.: 866,975

[22] Filed: Jun. 2, 1997

[51] Int. Cl.[6] .................................................. F16K 35/00
[52] U.S. Cl. ................................... 70/178; 70/232; 70/56
[58] Field of Search .............................. 70/158, 163, 164, 70/166–169, 175–180, 232, 52, 54, 56

[56] References Cited

U.S. PATENT DOCUMENTS

| | | | |
|---|---|---|---|
| 1,131,821 | 3/1915 | Campbell | 70/178 X |
| 1,215,958 | 2/1917 | Miller | 70/178 X |
| 1,500,849 | 7/1924 | Rudolph | 70/178 X |
| 1,530,814 | 3/1925 | Credle | 70/178 |
| 1,690,461 | 11/1928 | Sieben | 70/178 X |
| 1,920,128 | 7/1933 | Mickler | 70/178 |
| 2,094,773 | 10/1937 | Cohick | 70/178 |
| 3,181,523 | 5/1965 | Casey | 70/232 |
| 3,206,955 | 9/1965 | Horovitz | 70/163 |
| 4,370,919 | 2/1983 | Wagner et al. | 70/180 X |
| 4,418,551 | 12/1983 | Kochakis | 70/164 X |
| 4,538,434 | 9/1985 | Tanzen Sr. | 70/178 |
| 5,255,545 | 10/1993 | Wheeler | 70/232 |

FOREIGN PATENT DOCUMENTS 466917  8/1950  Canada .................................... 70/178

*Primary Examiner*—Suzanne Dino
*Attorney, Agent, or Firm*—Dallet Hoopes

[57] ABSTRACT

The present invention is a safety guard comprising a pair of opposed cups adapted to receive the opposite ends of the aerosol container respectively. Each cup has an integral arm extending toward the opposite cup, each arm having a perpendicular flange. One of the flanges is formed with an opening for receiving a portion of the other arm, the flanges adapted to engage each other and having apertures aligned when the flanges are together. The apertures are adapted to receive the shackle of a padlock to lock the guard installed over an aerosol container in a way which may be removed only by authorized cognitive persons.

5 Claims, 2 Drawing Sheets

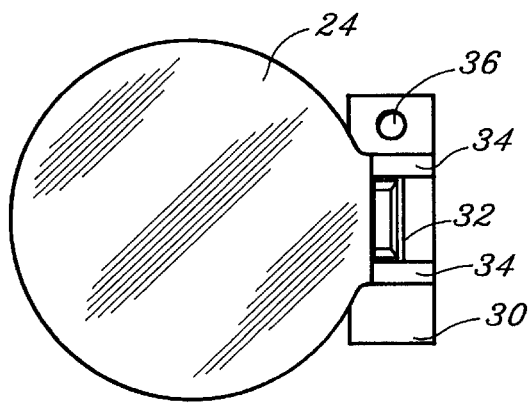
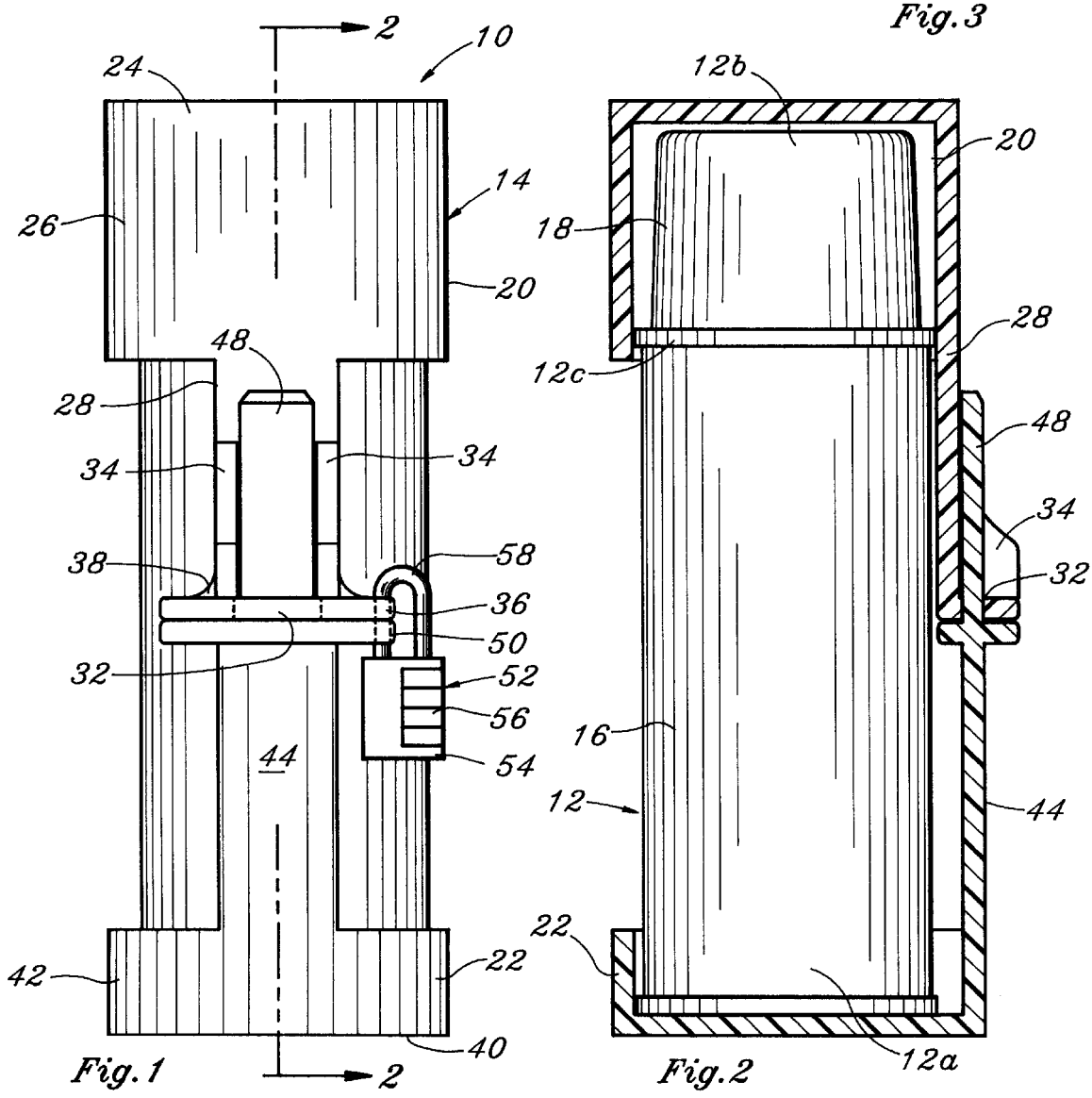

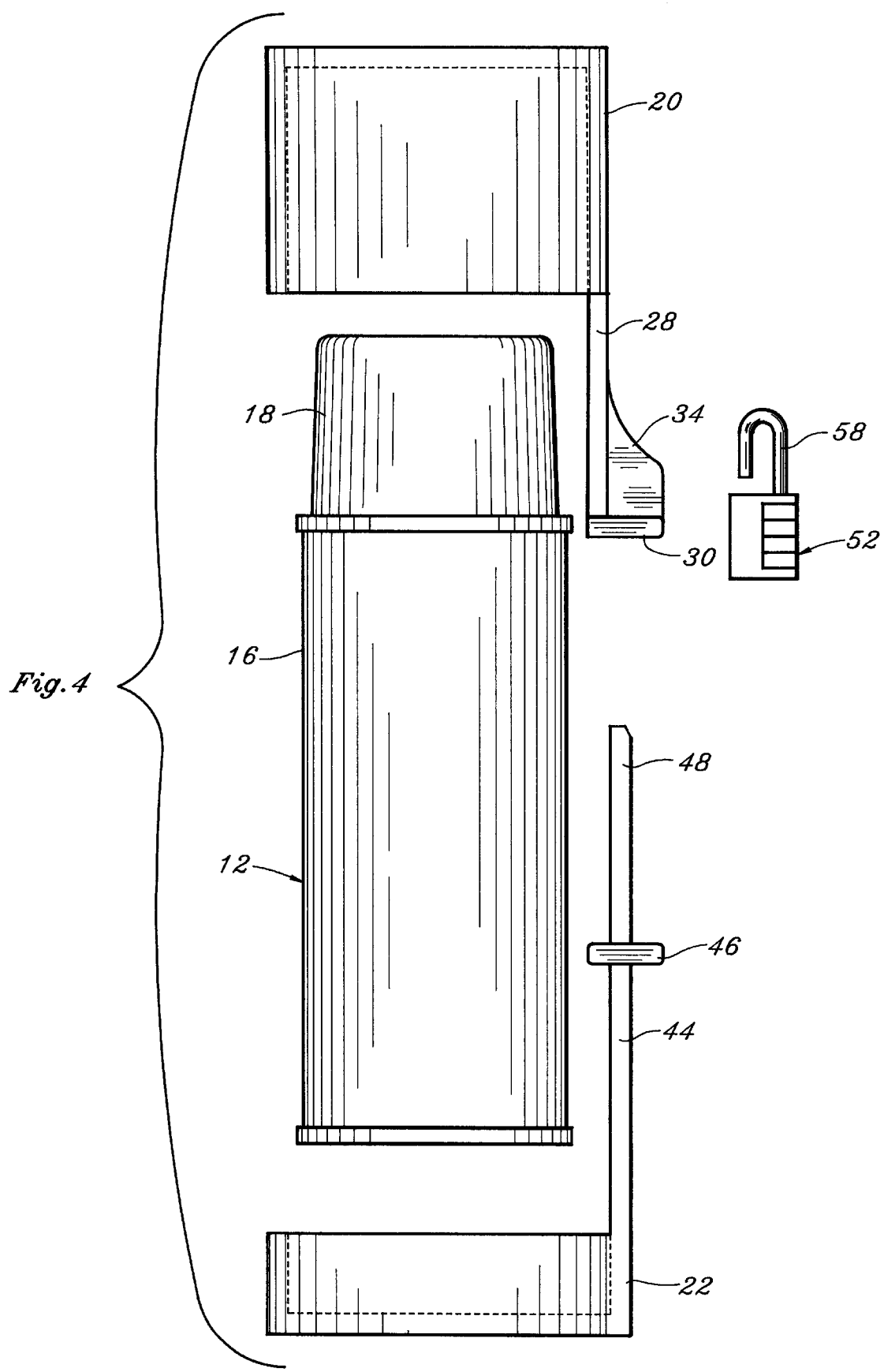

SAFETY GUARD FOR AEROSOLS

FIELD OF THE INVENTION

This invention relates to a safety guard adapted for installing over a pressurized aerosol container. It is adapted to be locked with an ordinary commercial padlock.

BACKGROUND OF THE INVENTION

The tragedy of children gaining access to aerosol containers having toxic contents is all too common. There has long been a need for a reliable means of locking an aerosol container against use by children and other unauthorized persons. Ideally, such a means should not require modification or alteration of the aerosol container itself in any way. Such a guard should be adapted to be readily applied and removable by authorized persons.

SUMMARY OF THE INVENTION

The present invention is a safety guard comprising a pair of opposed cups adapted to receive the opposite end of the aerosol container respectively. Each cup has an integral arm extending toward the opposite cup, and each arm has a perpendicular flange. One of the flanges is formed with an opening for receiving a portion of the other arm, and the flanges are adapted to engage each other when the guard is installed on a container. The flanges have apertures aligned when the flanges are together. The apertures are adapted to receive the shackle of a padlock to hold the guard installed over an aerosol container.

BRIEF DESCRIPTION OF THE DRAWINGS

Other objects and features of the invention will be clear to those skilled in the art from a review of the following specification and drawings, all of which present a non-limiting form of the invention. In the drawings:

FIG. 1 is a right side elevational view of a locked dispenser embodying the invention;

FIG. 2 is a sectional view taken on the line 2—2 of FIG. 1 showing the aerosol container in profile;

FIG. 3 is a top plan view; and

FIG. 4 is an exploded front elevational view.

DESCRIPTION OF THE PREFERRED EMBODIMENT

A locked dispenser embodying the invention is generally designated 10 in FIG. 1. It comprises a capped aerosol container 12 and a safety guard 14. As is customary, the container comprises a can 16 having a snap-on plastic cap 18 under which is an aerosol valve and actuator (not shown). The safety guard comprises an upper cup 20 and a lower cup 22.

The upper cup has a top wall 24 and a depending side wall 26. Integral with the side wall 26 is a downward arm 28 which may be rectangular in cross-section and which terminates downwardly in a perpendicular flange 30 having an opening 32 therein. Extending upward and integral with the flange 30 and arm 28 are a pair of spaced guides 34. The flange is apertured as at 36 and filets 38 are provided to reenforce the structure of the integral arm 28 and flange 30.

The lower cup 22 comprises a bottom wall 40 and an upwardly extending side wall 42. Formed unitarily with the side wall 22 is the upward arm 44. The upward arm terminates in a perpendicular flange 46 which is co-extensive with the flange 30. The two flanges abut as shown in FIG. 1. The arm 44 extends upward from the flange 46 in a narrow tongue 48 which extends through the opening 32 in the flange 30. The tongue 48 is guided in its entry through the opening 32 by the spaced guides 34 which are disposed on either side thereof and support the tongue 48 against lateral movement. The flange 46 is formed with an aperture 50 in alignment with the aperture 36 in the upper flange 30.

A padlock 52 is provided and comprises a body 54 having combination disks 56 thereon and a shackle 58. In locking the guard, the free end of the shackle 58 is received through the apertures 36, 50, and snapped shut. Longitudinal reenforcing ribs (not shown) may be provided on the arms 28, 44 if desired or necessary.

In use and assembly, the aerosol container 12 to be locked is aligned (FIG. 4) with the properly sized upper cup 20 and lower cup 22. The arms 28 and 44 extend respectively toward each other. The cups 20, 22 are brought together over the opposite ends 12a and 12b of the container 12 respectively, the tongue 48 being received into the opening 32 of the flange 30. The flanges 30, 46 are brought into abutment (FIG. 2), the guides 34 assisting in keeping the cups 20, 22 in proper aligned relationship. With the apertures 36, 50 aligned (FIG. 3), the shackle 58 of the padlock 52 is brought through the apertures and snapped shut into its body 54.

The depth of the upper cup 20 is such that the lower edge of the side walls 26 extends well below the chime 12c of the aerosol container (FIG. 2) so that it is not possible to defeat the guard by prying against the chime 12c with a levering tool against the under rim 20a. The abutting of the flanges 30, 46 also assist in this regard. With the guard locked in place, children and other unauthorized persons will be unable to gain access to, much less operate, the dispenser comprising the container 12.

When access is desired and authorized, the user can simply operate the lock 52 to open the shackle 58 and remove it from the apertures 36, 50. From this point it is a simple matter to merely lift the upper cup 24, telescoping the opening 32 up off the tongue 48. The cap 18 can then be removed from the container 12 and access can be had to the aerosol actuator (not shown).

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A dispenser assembly comprising in combination
   a. a pressurized aerosol container defined by a closed cylindrical can having a sidewall, an upper end and a lower end and a valved outlet at said upper end, and
   b. a safety guard comprising a pair of opposed cups receiving the opposite ends of the container respectively, each cup having an integral arm extending toward the opposite cup, the arms lying side-by-side for a portion of the arms, each arm having a flange perpendicular to the arm, one of the flanges formed with an opening receiving a portion of the other arm, the flanges engaging each other and being formed with aligned apertures adapted to receive a shackle of a padlock.

2. A dispenser assembly as claimed in claim 1 wherein the arms are rectangular in cross-section.

3. A dispenser assembly as claimed in claim 1 wherein the flanges are coextensive with each other when the flanges engage.

4. A dispenser assembly as claimed in claim 1 wherein the portion of the other arm received in the opening is in the form of a narrowed tongue.

5. A dispenser assembly as claimed in claim 1 wherein one of the arms is formed with guide ribs laterally guiding the other arm for the portion of their length that the arms lie side-by-side.

* * * * *